US010154151B2

(12) United States Patent
Castro Castro et al.

(10) Patent No.: US 10,154,151 B2
(45) Date of Patent: *Dec. 11, 2018

(54) METHODS AND APPARATUS FOR IMPLEMENTING POLICY AND CHARGING CONTROL

(75) Inventors: Fabian Castro Castro, Madrid (ES); Susana Fernandez Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 308 days.

This patent is subject to a terminal disclaimer.

(21) Appl. No.: 14/414,484

(22) PCT Filed: Jul. 19, 2012

(86) PCT No.: PCT/EP2012/064218
§ 371 (c)(1),
(2), (4) Date: Jan. 13, 2015

(87) PCT Pub. No.: WO2014/012594
PCT Pub. Date: Jan. 23, 2014

(65) Prior Publication Data
US 2015/0172471 A1 Jun. 18, 2015

(51) Int. Cl.
*H04W 72/04* (2009.01)
*H04M 15/00* (2006.01)
(Continued)

(52) U.S. Cl.
CPC ........ *H04M 15/66* (2013.01); *H04L 65/1006* (2013.01); *H04L 67/1036* (2013.01);
(Continued)

(58) Field of Classification Search
CPC ...... H04W 72/04; H04W 88/08; H04W 72/00
See application file for complete search history.

(56) References Cited

U.S. PATENT DOCUMENTS

2009/0270097 A1* 10/2009 Gallagher ............... H04W 8/08
455/435.1
2010/0186064 A1* 7/2010 Huang .................... H04L 12/14
726/1

(Continued)

OTHER PUBLICATIONS

PCT Notification of Transmittal of the International Search Report and the Written Opinion of the International Searching Authority, or the Declaration for International application No. PCT/EP2012/064218, dated May 6, 2013.

(Continued)

*Primary Examiner* — Hassan A Phillips
*Assistant Examiner* — Prenell P Jones
(74) *Attorney, Agent, or Firm* — Baker Botts, LLP

(57) ABSTRACT

According to the present invention there is provided a method of ensuring that all AF sessions for an IP-CAN session reach the same PCRF when more than one PCRF is deployed in an operator network. The method involves configuring a PCRF such that, upon receipt of a request relating to the establishment or modification of the IP-CAN session, the PCRF determines one or more Application Detection and Control (ADC) rules for identifying application messages associated with the IP-CAN session and that require that an address of the PCRF must be included in the identified AF session messages. The PCRF is further configured to provision the one or more ADC rules at an ADC node.

18 Claims, 7 Drawing Sheets

(51) Int. Cl.
*H04W 76/10* (2018.01)
*H04L 29/08* (2006.01)
*H04L 29/06* (2006.01)
*H04W 76/12* (2018.01)
*H04L 12/14* (2006.01)
*H04L 12/26* (2006.01)

(52) U.S. Cl.
CPC ......... *H04W 76/10* (2018.02); *H04L 12/1407* (2013.01); *H04L 43/028* (2013.01); *H04W 76/12* (2018.02)

(56) References Cited

U.S. PATENT DOCUMENTS

| | | | | |
|---|---|---|---|---|
| 2011/0302289 | A1* | 12/2011 | Shaikh | H04L 29/12216 709/223 |
| 2012/0218888 | A1* | 8/2012 | Cutler | H04L 67/32 370/230 |
| 2012/0246325 | A1* | 9/2012 | Pancorbo Marcos | H04L 12/2602 709/227 |
| 2012/0284394 | A1* | 11/2012 | Rasanen | H04L 41/0873 709/224 |
| 2013/0097326 | A1* | 4/2013 | Yeung | H04W 4/00 709/227 |
| 2014/0189137 | A1* | 7/2014 | Castro Castro | H04M 15/66 709/228 |
| 2015/0009826 | A1* | 1/2015 | Ma | H04W 28/0268 370/235 |
| 2015/0011182 | A1* | 1/2015 | Goldner | H04M 15/66 455/406 |
| 2015/0281465 | A1* | 10/2015 | Mo | H04L 41/5067 455/405 |

OTHER PUBLICATIONS

3GPP TS 23.203 V11.6.0 (Jun. 2012) 3rd Generation Partnership Project; Technical Specification Group Services and System Aspects; Policy and charging control architecture (Release 11), 2012.

3GPP TS 29.213 V11.3.0 (Jun. 2012) 3rd Generation Partnership Project; Technical Specification Group Core Network and Terminals; Policy and Charging Control signalling flows and Quality of Service (QoS) parameter mapping (Release 11), 2012.

* cited by examiner

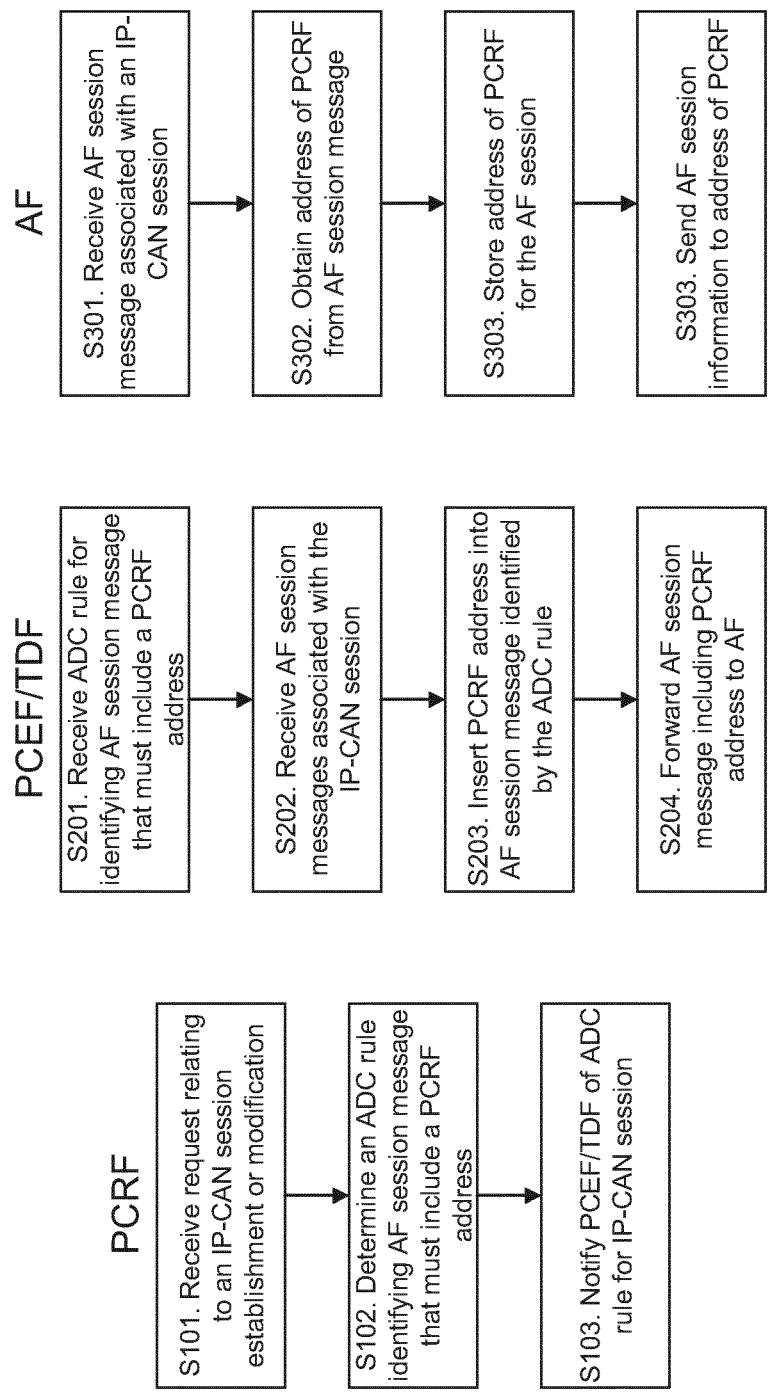

METHODS AND APPARATUS FOR IMPLEMENTING POLICY AND CHARGING CONTROL

PRIORITY

This nonprovisional application is a U.S. National Stage Filing under 35 U.S.C. § 371 of International Patent Application Serial No. PCT/EP2012/064218, filed Jul. 19, 2012, and entitled "METHODS AND APPARATUS FOR IMPLEMENTING POLICY AND CHARGING CONTROL."

TECHNICAL FIELD

The present invention relates to methods and apparatus for implementing policy and charging control. More particularly, the invention relates to methods and apparatus for ensuring that all Application Function sessions for an IP-CAN session reach the same Policy and Charging Rules Function when more than one Policy and Charging Rules Function is deployed in an operator network.

BACKGROUND

Telecommunications services provided over an IP Connectivity Access Network (IP-CAN) can be subject to charging and policy control mechanisms. This includes Quality of Service (QoS) control. Accordingly, some telecommunications systems incorporate Policy and Charging Control (PCC) architectures to provide this control. 3GPP TS 23.203 describes such a PCC architecture in respect of packet flows in an IP-CAN session established by a user equipment (UE) through an Evolved 3GPP telecommunications system, including both 3GPP accesses (GERAN/UTRAN/E-UTRAN) and Non-3GPP accesses. FIG. 1 illustrates schematically an example of the PCC architecture described in 3GPP TS 23.203 that comprises a Policy and Charging Enforcement Function (PCEF), a Traffic Detection Function (TDF), a Bearer Binding and Event Reporting Function (BBERF), a Policy and Charging Rules Function (PCRF), an Application Function (AF), an Online Charging System (OCS), an Offline Charging System (OFCS) and the Subscription Profile Repository (SPR).

The PCRF is a functional element that encompasses policy control decision and flow based charging control functionalities. The PCRF provides policy and charging control for the media components negotiated between the user terminal and the AF. The PCRF receives session and media related information from the AF and informs the AF of traffic plane events. The PCRF also provides network control regarding service data flow detection, gating, QoS and flow based charging (except credit management) towards the PCEF. The PCRF can provision PCC rules and PCC decisions to the PCEF via the Gx reference point, and may provision QoS Rules to the BBERF via the Gxx reference point (for deployments based on PMIP/DSMIP protocol in the core network). Criteria such as the QoS subscription information may be used together with policy rules such as, service-based, subscription-based, or pre-defined PCRF internal policies to derive the authorized QoS to be enforced for a service data flow. The PCRF PCC decisions may be based on one or more of the following:

information obtained from the AF via the Rx reference point, e.g. the session, media and subscriber related information;

information obtained from the PCEF via the Gx reference point, e.g. IP-CAN bearer attributes, request type, subscriber related information and location information;

information obtained from the SPR via the Sp reference point, e.g. subscriber and service related data;

information pre-defined in the PCRF; and information obtained from BBERF via the so-called Gxx reference point.

The PCEF is a functional entity that behaves as a Policy Enforcing Point (PEP) for enforcing decisions instructed by the PCRF and the OCS. The PCEF provides service data flow detection (based on the service data flow filter filters defined in the PCC rules) to capture and analyse any user and signalling traffic, to identify the user and to capture details of the service(s) being used. The PCEF can then communicate this information to the PCRF over the Gx interface, to the OCS over the Gy interface and to the OFCS over the Gz interface. The PCEF enforces QoS control according to the QoS authorised by the PCRF. The PCEF is preferably co-located within the gateway node implementing the IP access to the Packet Data Network (PDN). As such, in a GPRS core network the PCEF is located within the GPRS Gateway Support Node (GGSN), whilst in the case of a CDMA2000 network the PCEF may be located in a Packet Data Serving Node (PDSN), and in a WLAN network the PCEF may be located in a Packet Data Gateway (PDG).

The BBERF functionality includes bearer binding, uplink bearer binding verification and event reporting to the PCRF. For example, in a GPRS core network the bearer binding mechanism associates the PCC rule with the PDP context that is to carry the service data flow. When GPRS Tunnelling Protocol (GTP) is used between the BBERF and the PCEF then bearer binding is performed by the PCEF. Alternatively, when Proxy Mobile IP (PMIP) is used between the BBERF and the PCEF, instead of GTP, then bearer binding is performed by the BBERF.

The OCS provides authorization for the usage of network resources based on the provisioned data and the user activity information it receives from PCEF. This authorization must be granted by the OCS prior to the actual resource usage. When receiving a network resource usage request, the network assembles the relevant charging information and generates a charging event towards the OCS in real-time. The OCS then returns an appropriate resource usage authorization over the Gy interface. The resource usage authorization may be limited in its scope (e.g. volume of data or duration) therefore this authorization may have to be renewed from time to time as long as the user's resource usage persists. The OCS can support time, volume and event-based charging.

The SPR contains all subscriber/subscription related information needed for subscription-based policies and IP-CAN bearer level PCC rules by the PCRF. The Sp interface allows the PCRF to request subscription information related to the IP-CAN transport level policies from the SPR based on a subscriber ID and other IP-CAN session attributes.

The Application Function (AF) is an element offering applications in which service is delivered in a different layer (i.e. transport layer) from the one the service has been requested (i.e. signaling layer). These applications require policy and/or charging control of the IP-CAN user plane behaviour. The AF therefore communicates with the PCRF over the Rx interface to transfer dynamic session information (e.g. a description of the media to be delivered in the transport layer) required for PCRF decisions, as well as to receive IP-CAN specific information and notifications about IP-CAN bearer level events. One example of an AF is the P-CSCF of the IP Multimedia Core Network (IM CN) subsystem. In the case of a P-CSCF, the information communicated over the Rx interface is derived from the P-CSCF session information (e.g. SDP when SIP is used for signalling) and it mainly includes media components. A media component comprises a set of IP flows, each of which is described by a 5-tuple, the media type and required bandwidth.

3GPP Release 11 has introduced Application Detection Control (ADC) functionality into the PCC architecture. This ADC functionality provides for requests to detect the traffic of a specified application, reporting to the PCRF on the start or stop of application traffic and the application of specified enforcement actions.

Consequently, this ADC functionality requires Deep Packet Inspection (DPI) of packets in order to monitor the payload of packets and to detect when an application is initiated/terminated etc. This ADC functionality can be provided by the PCEF, in which case the PCEF is referred to as PCEF enhanced with Application Detection Control (ADC) functionality, or by the separate TDF entity. There are two different models that can be applied for ADC; solicited and unsolicited application reporting. For solicited application reporting, the PCRF instructs the ADC node (i.e. the TDF, or the PCEF enhanced with ADC) as to which applications to detect and report to the PCRF by provisioning the appropriate ADC rules. The PCRF may also, in a dynamic ADC rule, instruct the ADC node as to what enforcement actions to apply for the detected application traffic. For unsolicited application reporting, the ADC node is pre-configured as to which applications to detect and report.

The PCRF can provision an ADC node with ADC rules by activating an ADC rule that is configured at the ADC node (i.e. using the ADC-Rule-Name AVP), or by installing a PCRF-provisioned ADC rule (i.e. using a ADC-Rule-Definition AVP within an ADC-Rule-Install AVP). The ADC-Rule-Definition AVP includes the TDF Application Identifier AVP that references the application (e.g. its value may represent an application such as a list of URLs, etc.) for which the ADC rule applies. In order to be informed as to when an application, defined by TDF Application Identifier AVP, is started and/or stopped, the PCRF can subscribe to the APPLICATION_START/APPLICATION_STOP Event-Triggers.

FIG. 2 is a signalling flow diagram illustrating an example of the establishment of an application session in which the service is a voice call over an IP Multimedia Subsystem (IMS). In this example, the user of User Equipment (UE) A initiates the voice call service, and UE A therefore generates and sends a Session Initiation Protocol (SIP) INVITE message including an appropriate Session Description Protocol (SDP) offer (e.g. specifying audio media and the offered codecs) (A1). The SIP INVITE is routed towards UE B via a P-CSCF (i.e. an AF) in the originating network (A2), and then via a P-CSCF (i.e. an AF) in the terminating network (A3). Upon receiving the SIP INVITE at UE B, UE B generates and sends a SIP 180 Ringing provisional response to UE A (A4). The SIP 180 Ringing response is routed to UE A via the P-CSCF in the terminating network (A5), and then via the P-CSCF the originating network (A6), before being received at UE A. When user B then answers the call (A7), UE B generates and sends a SIP 200 OK response, and includes an SDP answer in the SIP 200 OK response that indicates which of the offered codes are preferred (A8). The SIP 200 OK response is routed to UE A via the P-CSCF in the terminating network (A9), and then the P-CSCF the originating network (A10), before being received at UE A. The P-CSCF in the originating network therefore initiates establishment of an AF session by sending a Diameter Authentication-Authorization-Request (AAR) message to a PCRF in the originating network over an Rx interface (A11). The P-CSCF in the terminating network also initiates establishment of an AF session by sending an AAR message to a PCRF in the terminating network over an Rx interface (A12). These AAR messages include service information such as an application identifier (i.e. in an AF-Application-Identifier AVP), the codecs negotiated by UE A and UE B (i.e. taken from the SDP answer), and the flow information (i.e. in a Flow-Description AVP).

Upon receipt of an AAR message, both the originating PCRF (A13) and the terminating PCRF (A14) respond to the respective AAR messages by generating and sending an Authenticate and Authorize Answer (AAA) message. Both the originating PCRF (A15) and the terminating PCRF (A16) then perform session binding, associate the described service IP flows within the AF session information to an existing IP-CAN session, and perform the PCC rule authorization. Both the originating PCRF (A17) and the terminating PCRF (A18) then generate and send a Re-Authorization Request (RAR) message to request that the corresponding PCEF (i.e. implemented at the PDN GW) installs, modifies or removes PCC rules in accordance with the PCC rules authorized by the PCRF. Both the originating PCEF (A19) and the terminating PCEF (A20) therefore install the PCC rules received from the respective PCRF and generate and send a Re-Authorization Answer (RAA) message to the corresponding PCRF to acknowledge the RAR message. Both the originating PCEF (A21) and the terminating PCEF (A22) then initiate the establishment of a dedicated IP-CAN bearer for the service over the access network currently used by the corresponding UE. As a result, the voice call between UE A and UE B is provided over the established bearers.

A problem arises when more than one PCRF is present in an operator network. In this situation, the AF must be able to discover which of the multiple PCRFs is responsible for the IP-CAN session that is to be modified as a result of the AF session, such that the service information is sent to the appropriate PCRF (as required in steps A11 and A12 of FIG. 2). In order to solve this problem, the 3GPP standards propose introducing a Diameter Routing Agent (DRA) entity that ensures that all Diameter sessions for a certain IP-CAN session reach the same PCRF, as illustrated in FIG. 3. To do so, the DRA needs to maintain the status of the PCRF assigned for a certain UE and IP-CAN session. This status must at least include an index key and the address of the PCRF, wherein the index key must unambiguously identify a single IP-CAN session. Typically, this index key will comprise the UE IP address that is conveyed over both Gx and Rx interfaces. However, if the index key is based exclusively on the IP address, then it is not possible to support overlapping IP addresses, which are commonly used in Virtual Private Network (VPN) scenarios or multi-tenancy networks. Whilst the 3GPP standards state that the DRA can also make use of information such as the user identity (i.e. the UE Network Access Identifier) and the Access Point Name (APN), this information is not provided over the Rx interface from an IMS network, such that even this solution is not sufficient. For example, the access network will be aware of the IMSI/MSISDN and can provide this to the PCRF over the Gx interface. However, an AF such as an IMS P-CSCF will only be aware of the IMPU/IMPI and can therefore only provide this to the PCRF over the Rx interface.

SUMMARY

It is therefore an object of the present invention to provide methods and apparatus for ensuring that all AF sessions for an IP-CAN session reach the same PCRF when more than one PCRF is deployed in an operator network.

According to a first aspect of the present invention there is provided a method of ensuring that all AF sessions for an IP-CAN session reach the same PCRF when more than one PCRF is deployed in an operator network. The method comprises, at a PCRF:
  upon receipt of a request relating to the establishment or modification of the IP-CAN session, determining an Application Detection and Control (ADC) rule for identifying application messages associated with the IP-CAN session in which the address of the PCRF must be included; and
  notifying a node that implements application detection and control of the ADC rule.

The step of notifying a node that implements application detection and control of the ADC rule can comprises any one of installing the ADC rule at the node that implements application detection and control, and activating the ADC rule at the node that implements application detection and control. The node that implements application detection and control can be any one of a Policy and Charging Enforcement Function (PCEF) enhanced with ADC, and a Traffic Detection Function, (TDF).

The ADC rule can include the address of the PCRF that must be included in an application message identified by the ADC rule.

According to a second aspect of the present invention there is provided a method of ensuring that all Application Function, AF, sessions for an IP Connectivity Access Network, IP-CAN, session reach the same Policy and Charging Rules Function, PCRF, when more than one PCRF is deployed in an operator network. The method comprises, at a node that implements application detection and control:
  receiving, from a PCRF, notification of an Application Detection and Control (ADC) rule that is to be applied for the IP-CAN session, wherein the ADC rule identifies application messages associated with the IP-CAN session in which the address of the PCRF must be included; and
  using the ADC rule to identify an application message associated with the IP-CAN, inserting the address of the PCRF into the identified application message, and forwarding the identified application message to the AF.

The step of receiving, from a PCRF, notification of an ADC rule can comprise any one of receiving the ADC rule from the PCRF for installation at the node, and receiving from the PCRF an instruction to activate the ADC rule, wherein the ADC rule is configured at the node. The node that implements application detection and control can be any one of a Policy and Charging Enforcement Function (PCEF) enhanced with ADC, and a Traffic Detection Function (TDF). The ADC rule may include the address of the PCRF that must be included in an application message identified by the ADC rule.

The AF may be a Proxy Call Session Control Function (P-CSCF) of an IP Multimedia Subsystem (IMS). The ADC rule may identify a Session Initiation Protocol (SIP) message. The method may then comprise using the ADC rule to identify a SIP message associated with the IP-CAN, inserting the address of the PCRF into the SIP message, and forwarding the SIP message to a P-CSCF.

The address of the PCRF may be included within a P-Access-Network-Info header of the SIP message. The address of the PCRF may be included as a value of an extension-access-info header field of the P-Access-Network-Info header. Alternatively, the address of the PCRF may be included within a header of the SIP message that is defined as specifying the address of the PCRF.

According to a third aspect of the present invention there is provided a method of ensuring that all Application Function (AF) sessions for an IP Connectivity Access Network (IP-CAN) session reach the same Policy and Charging Rules Function (PCRF) when more than one PCRF is deployed in an operator network, the method comprising, at an Application Function (AF):
  receiving an application message that includes an address of a PCRF; and
  using the received PCRF address to provide service information for the AF session to the PCRF.

The method may further comprise storing the address of the PCRF for the AF session. The application message may be received from a User Equipment of a user that has established an IP-CAN session.

The AF may be a Proxy Call Session Control Function (P-CSCF) of an IP Multimedia Subsystem (IMS). The method may then further comprise receiving a Session Initiation Protocol (SIP) message from a UE for which the IP-CAN session has been established, and retrieving the address of the PCRF from a header of the SIP message. The address of the PCRF may be retrieved from a P-Access-Network-Info header of the SIP message. The address of the PCRF may be retrieved from an extension-access-info header field of the P-Access-Network-Info header. Alternatively, the address of the PCRF may be included within a header of the SIP Register message that is defined as specifying the address of the PCRF.

According to a fourth aspect of the present invention there is provided an apparatus configured to operate as a Policy and Charging Rules Function (PCRF). The apparatus comprises:
  a receiver configured to receive a request relating to establishment or modification of an IP-CAN session;
  a processor configured to determine an Application Detection and Control (ADC) rule for identifying application messages associated with the IP-CAN session in which the address of the PCRF must be included; and
  a transmitter configured to notify a node that implements application detection and control of the ADC rule.

The processor may be configured to generate an ADC rule that includes the address of the PCRF that must be included in an application message identified by the ADC rule.

The apparatus may be configured to notify a node that implements application detection and control of the ADC rule by implementing any one of installation of the ADC rule at the node that implements application detection and control, and activation of the ADC rule at the node that implements application detection and control, wherein the ADC rule is configured at the node.

The transmitter may be configured to notify any one of a Policy and Charging Enforcement Function (PCEF) enhanced with ADC, and a Traffic Detection Function (TDF).

According to a fifth aspect of the present invention there is provided an apparatus configured to operate as a node that implements application detection and control. The apparatus comprises:
- a receiver configured to receive, from a Policy and Charging Rules Function (PCRF), notification of an Application Detection and Control (ADC) rule that is to be applied for an IP-CAN session, wherein the ADC rule identifies an application message associated with the IP-CAN session in which the address of the PCRF must be included;
- a processor configured to use the ADC rule to identify an application message associated with the IP-CAN session, and to insert the address of the PCRF into the identified application message; and
- a transmitter configured to forward the identified application message to an Application Function (AF).

The apparatus may be configured to operate as any one of a Policy and Charging Enforcement Function (PCEF) enhanced with ADC, and a Traffic Detection Function, TDF.

The processor may be configured to obtain the address of the PCRF from the ADC rule. The receiver may be further configured to receive application messages.

The transmitter may be configured to forward the application message to a Proxy Call Session Control Function (P-CSCF) of an IP Multimedia Subsystem (IMS). The receiver may be configured to receive a Session Initiation Protocol (SIP) message from a User Equipment (UE) for which the IP-CAN session has been established, the processor may then be configured to insert the address of the PCRF into a header of the SIP message, and the transmitter may be configured to forward the SIP message to the P-CSCF.

The processor may be configured to include the address of the PCRF within a P-Access-Network-Info header of the SIP Register message. The processor may be configured to include the address of the PCRF as a value of an extension-access-info header field of the P-Access-Network-Info header. Alternatively, the processor may be configured to include the address of the PCRF within a header of the SIP Register message that is defined as specifying the address of the PCRF.

According to a sixth aspect of the present invention there is provided an apparatus configured to operate as an Application Function (AF) of a Policy and Charging Control (PCC) architecture. The apparatus comprises:
- a receiver configured to receive an application message that includes an address of a Policy and Charging Rules Function (PCRF); and
- a processor configured to use the received PCRF address to provide service information for the AF session to the PCRF.

The receiver may be configured to receive the application message from a User Equipment (UE) of a user that has established an IP Connectivity Access Network, (IP-CAN) session. The apparatus may further comprise a memory configured to store the address of the PCRF for the AF session.

The apparatus may be configured to operate as a Proxy Call Session Control Function (P-CSCF) of an IP Multimedia Subsystem (IMS). The receiver may be configured to receive a Session Initiation Protocol (SIP) message from a UE for which an IP Connectivity Access Network (IP-CAN) session has been established; and the processor may be configured to retrieve the address of the PCRF from a header of the SIP message.

The processor may be configured to retrieve the address of the PCRF from a P-Access-Network-Info header of the SIP message. The processor may be configured to retrieve the address of the PCRF from an extension-access-info header field of the P-Access-Network-Info header. Alternatively, the processor may be configured to retrieve the address of the PCRF from within a header of the SIP message that is defined as specifying the address of the PCRF.

BRIEF DESCRIPTION OF THE DRAWINGS

Some embodiments of the present invention will now be described in detail with reference to the accompanying drawings, in which:

FIG. 4 is a flow diagram illustrating an example of the procedure implemented by a PCRF in accordance with the methods described herein;

FIG. 5 is a flow diagram illustrating an example of the procedure implemented by an ADC node in accordance with the methods described herein;

FIG. 6 is a flow diagram illustrating an example of the procedure implemented by an AF in accordance with the methods described herein;

DETAILED DESCRIPTION

Figure 1:
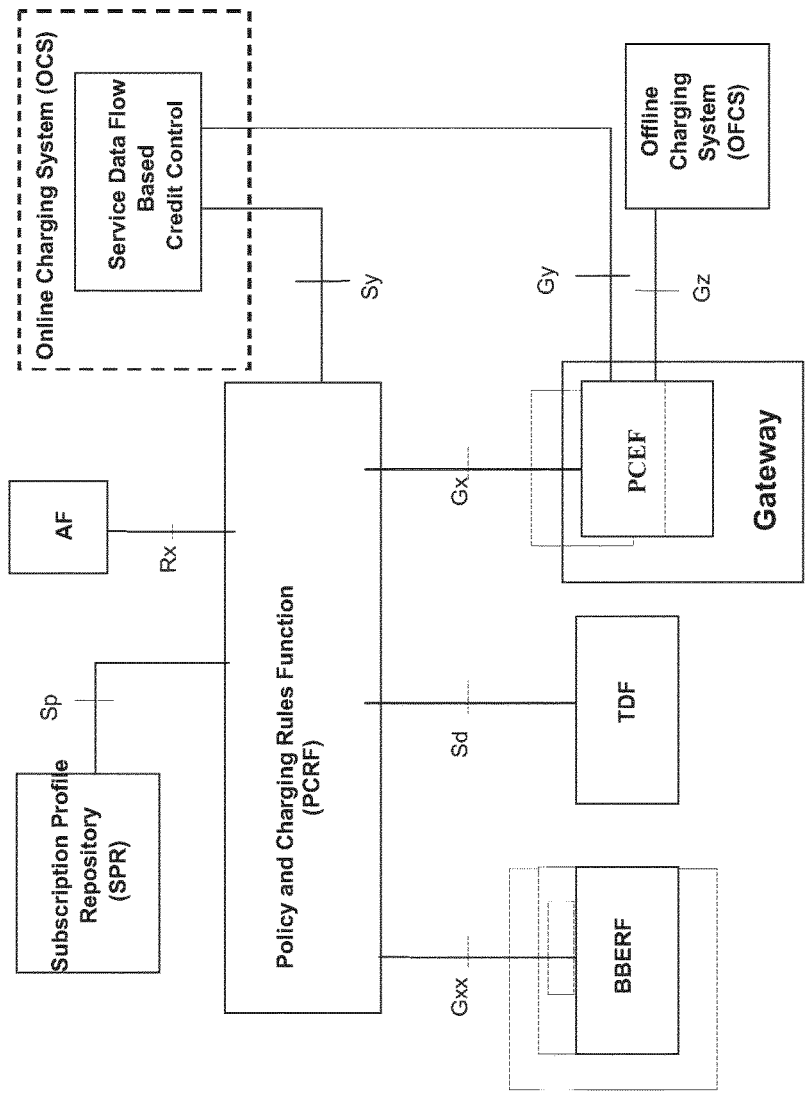
FIG. 1 illustrates schematically an example of the Policy and Charging Control (PCC) architecture.
Figure 2:
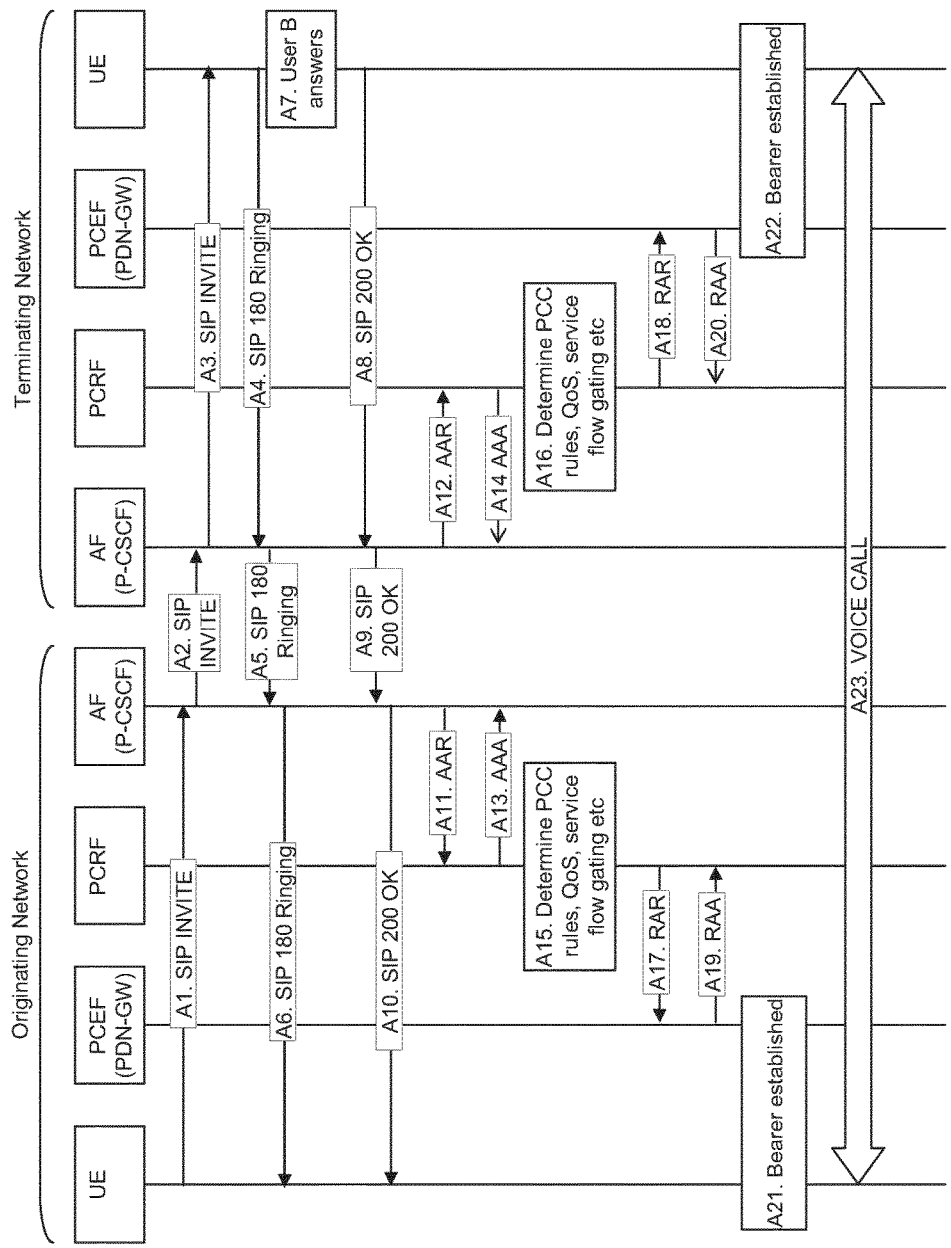
FIG. 2 is a signalling flow diagram illustrating an example of the establishment of an IP Multimedia Subsystem (IMS) session.
Figure 3:
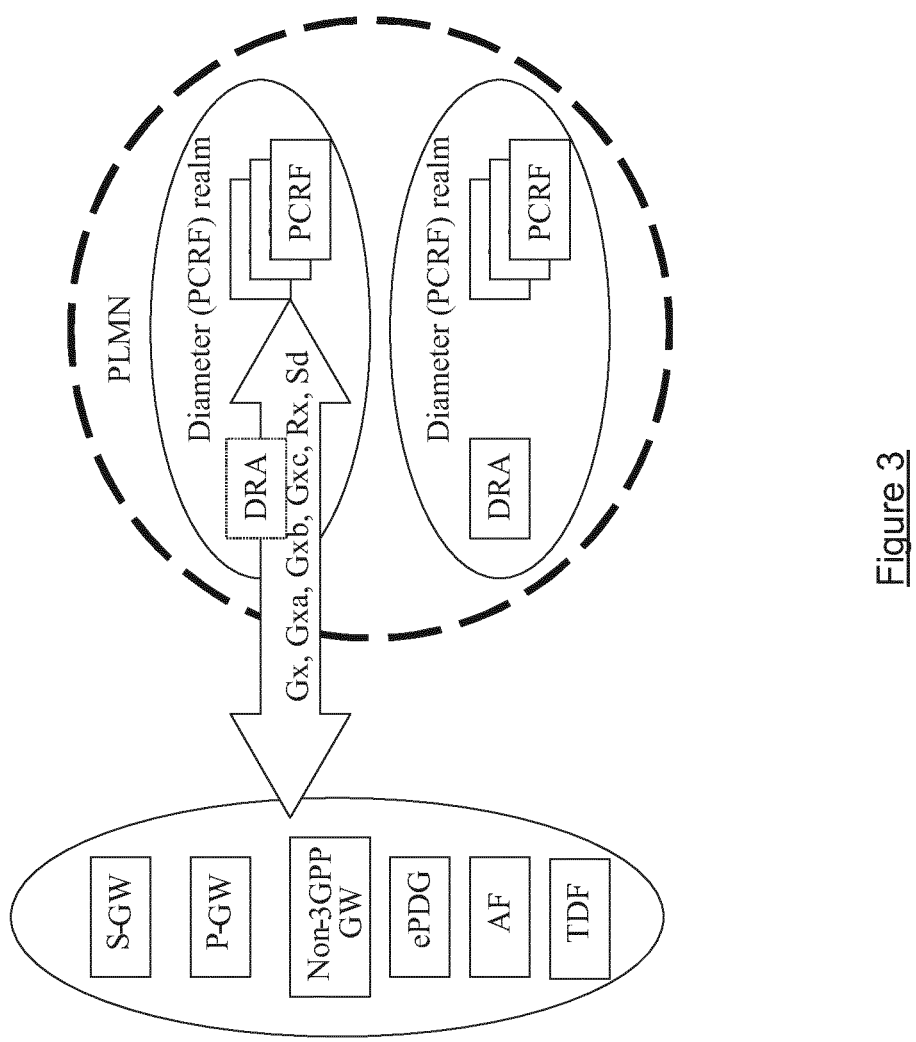
FIG. 3 illustrates schematically an example of a Diameter Routing Agent (DRA) deployment.

In order to at least mitigate the problems identified above there will now be described a method of ensuring that all AF sessions for an IP-CAN session reach the same PCRF when more than one PCRF is deployed in an operator network. The method involves configuring a PCRF such that, upon receipt of a request relating to the establishment or modification of the IP-CAN session, the PCRF determines one or more Application Detection and Control (ADC) rules for identifying application messages associated with the IP-CAN session and that require that an address of the PCRF must be included in the identified AF session messages. The PCRF is further configured to provision the one or more ADC rules at an ADC node (i.e. either a PCEF enhanced with ADC or a TDF). The ADC node is then configured to enforce the provisioned ADC rule(s) by identifying application messages in accordance with the ADC rule(s) and inserting the address of the PCRF into the identified application messages. An AF that receives such an application message is then configured to send service information for the AF session to the address of the PCRF that is included in the received application message. An application message is a message that relates to the application/service offered by an AF, and typically originates at the UE and addresses the AF.

To implement this method, the definition of an ADC rule requires extension in order to include an indication that the insertion of the address of PCRF is required for an application message identified by the ADC rule. For example, the ADC-Rule-Definition AVP that defines an ADC rule sent by the PCRF could be extended to include a PCRF-Insertion AVP that contains the address of a PCRF as the value. The inclusion of the PCRF-Insertion AVP would then serve as an indication that this ADC rule requires the insertion of the PCRF address into application messages identified by the rule. The ADC-Rule-Definition AVP could then have the format:

```
ADC-Rule-Definition ::= < AVP Header: 1094 >
                        { ADC-Rule-Name }
                        [ TDF-Application-Identifier ]
                        [ Flow-Status ]
                        [ QoS-Information ]
                        [ Monitoring-Key ]
                        [ Redirect-Information ]
                        [PCRF-Insertion]
                        * [ AVP ]
```

The ADC-Rule-Definition AVP is part of the ADC-Rule-Install AVP that is included in either a Credit-Control-Answer (CCA) message sent to a PCEF enhanced with ADC or a TDF-Session-Request (TSR) message sent to a TDF. It is also possible to use such an AVP as part of a grouped AVP that is intended to be used for a more generic purpose of adding content in the application protocols.

In addition, the application layer protocol used by the AF will typically require extension in order to allow the ADC node to include the address of the PCRF in application messages that traverse the ADC node en route to the AF. For example, when the application message is an IMS message, the SIP protocol will require extension in order to allow the SIP messages that traverse the ADC node to convey the PCRF address to the P-CSCF. For example, it is proposed herein that the PCRF address be included in the P-Access-Network-Info header. More specifically, it is proposed herein that the PCRF address be included in the extension-access-info parameter/element of the P-Access-Network-Info header that can be used to include a string or IP address. Alternatively, the SIP protocol could be extended to include a new header field that is specifically intended to carry the PCRF address. For example, a P-PCRF-Address-Header could specifically defined for this purpose. Of course, the methods described herein are equally applicable to other applications that make use of other application layer protocols. For example, the AF could be a HTTP streaming server and the application layer protocol would then be HTTP.

FIG. 4 is a flow diagram illustrating an example of the procedure implemented by a PCRF in order to ensure that all AF sessions for an IP-CAN session reach the same PCRF when more than one PCRF is deployed in an operator network. The steps performed are as follows:

S101. The PCRF receives requests that relate to the establishment or modification of an IP-CAN session.

S102. The PCRF then determines an ADC rule for identifying application messages associated with the IP-CAN session that must include a PCRF address.

S103. The PCRF then notifies an ADC node of the ADC rule for the IP-CAN session. The method by which the PCRF notifies an ADC node of the ADC rule depends on if the determined ADC rule is an ADC rule that has been configured at the ADC node, or if the determined ADC rule is a dynamic ADC rule that must be provided to the ADC node. If the determined ADC rule is a configured ADC rule, then the PCRF notifies the ADC node by activating the ADC rule at the ADC node using standard procedures. If the determined ADC rule is a dynamic ADC rule, then the PCRF must install the ADC rule at the ADC node using standard procedures. As previously described, the ADC node can be either a PCEF enhanced with ADC or a TDF.

FIG. 5 is a flow diagram illustrating an example of the procedure implemented by an ADC node in order to ensure that all AF sessions for an IP-CAN session reach the same PCRF when more than one PCRF is deployed in an operator network. The steps performed are as follows:

S201. The ADC node receives notification of an ADC rule for an IP-CAN session from the PCRF. This may involve the activation of an ADC rule configured at the ADC node, or the installation of the ADC rule at the ADC node by the PCRF. The ADC rule identifies application messages that must include an address of the PCRF.

S202. The ADC node then receives application messages associated with the IP-CAN session.

S203. The ADC node therefore uses the ADC rule to identify an application message that must include an address of the PCRF, and inserts the PCRF address into the identified application message.

S204. The ADC node then forwards the application message, including the PCRF address, to the AF.

FIG. 6 is a flow diagram illustrating an example of the procedure implemented by an AF in order to ensure that all AF sessions for an IP-CAN session reach the same PCRF when more than one PCRF is deployed in an operator network. The steps performed are as follows:

S301. The AF receives an application message from a UE for which an IP-CAN session has been established. The application message includes a PCRF address.

S302. The AF therefore obtains the PCRF address from the application message.

S303. The AF stores the obtained PCRF address for the AF session.

S304. The AF then sends any service information for the AF session to the PCRF address.

Figure 7:
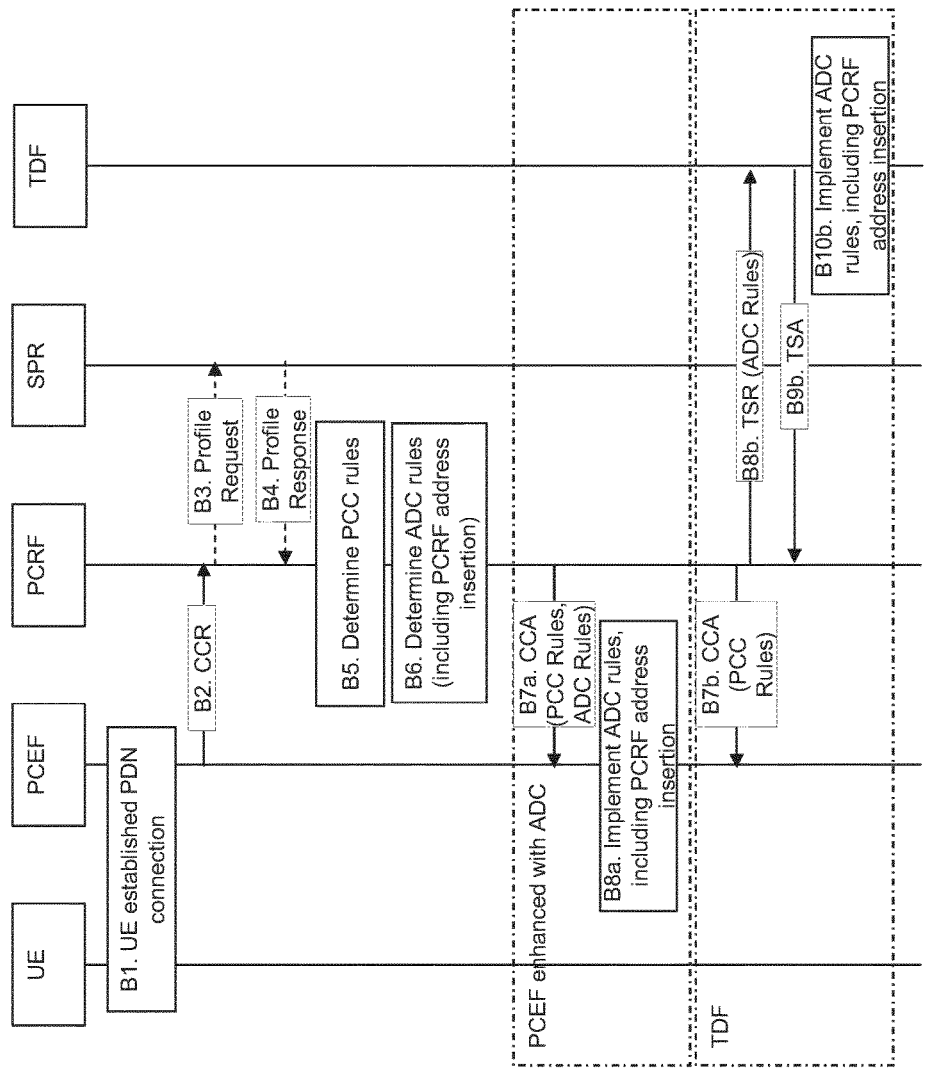
FIG. 7 illustrates an example signalling flow diagram of an IP-CAN session establishment in accordance with the methods described herein.

FIG. 7 illustrates an example signalling flow diagram of an IP-CAN session establishment for a UE in which one or more ADC rules are used to ensure that all AF sessions for an IP-CAN session reach the same PCRF in accordance with the methods described above. The steps performed are as follows:

B1. The UE establishes a PDN connection and thereby provides an establish IP-CAN session request to the PCEF.

B2. The PCEF informs the PCRF of the IP-CAN session establishment by sending a CCR message to the PCRF.

B3. If the PCRF requires subscription-related information and does not have it, the PCRF sends a profile request to the SPR in order to receive the information.

B4. In this case, the SPR replies with the subscription related information containing the information about the allowed service(s), QoS information, PCC Rules information etc.

B5. The PCRF determines the PCC Rule(s) to be installed. The PCRF may also make a policy decision by deriving an authorized QoS and by deciding whether service flows described in the PCC Rules are to be enabled or disabled. The PCRF stores the determined PCC Rules.

B6. The PCRF makes use of user profile configuration, received within subscription information, to determine if ADC is enabled/supported and, if so, to identify the appropriate ADC node (i.e. either a PCEF enhanced with ADC or a TDF). If ADC is enabled, the PCRF determines the applicable ADC rules, including one or more ADC rules for identifying application messages associated with the IP-CAN session in which the address of the PCRF should be included.

B7a. If the PCRF determines that the PCEF is enhanced with ADC, then the PCRF provisions the PCC rules and the ADC rules for the IP-CAN session to the PCEF in a CCA message. The provisioning of the PCC rules and the ADC rules can involve installing dynamic rules that are provided to the PCEF by the PCRF, or activating rules that have been configured at the PCEF.

B8a. The PCEF enhanced with ADC then enforces the provisioned ADC rules by identifying application messages in accordance with the ADC rules and inserting the address of the PCRF into the identified application messages.

B7b. If the PCRF determines that a TDF is deployed in the network, then the PCRF provisions the PCC rules for the IP-CAN session to the PCEF in a CCA message.

B8b. The PCRF also provisions the ADC rules to the TDF in a TSR message. The provisioning of the ADC rules can involve installing dynamic ADC rules that are provided to the TDF by the PCRF, or activating ADC rules that have been configured at the TDF.

B9b. The TDF acknowledges the TSR message by sending a TSA message to the PCRF.

B10b. The TDF then enforces the provisioned ADC rules by identifying application messages in accordance with the ADC rules and inserting the address of the PCRF into the identified application messages.

Figure 8:
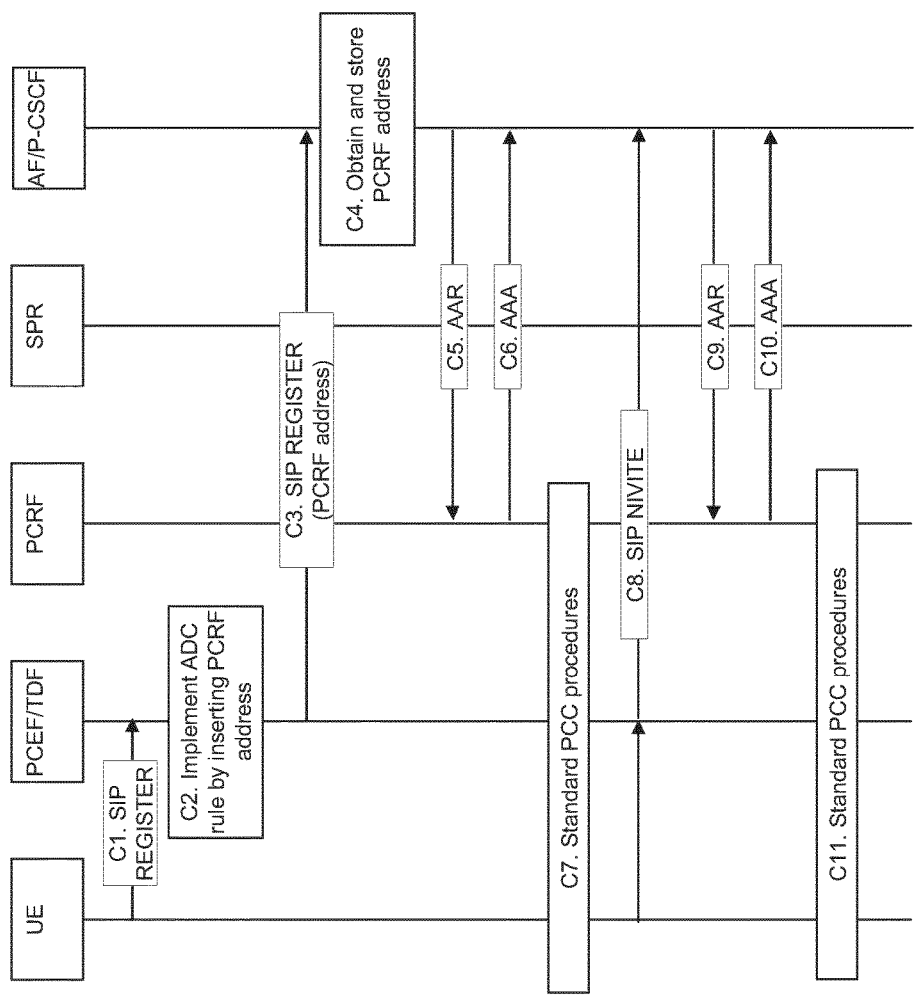
FIG. 8 illustrates an example signalling flow diagram of an application detection and control procedure in accordance with the methods described herein.

FIG. 8 illustrates an example signalling flow diagram of an application detection and control procedure in which an ADC node is provisioned with one or more ADC rules that are used to ensure that all AF sessions for an IP-CAN session reach the same PCRF in accordance with the methods described above. In this example, the application message detected by the ADC rules is an IMS message. The steps performed are as follows:

C1. The UE generates and sends a SIP REGISTER message towards the IMS.

C2. This SIP REGISTER message is routed via an ADC node (i.e. a PCEF enhanced with ADC or a TDF) that has been provisioned with one or more ADC rules by a PCRF, wherein one or more of these ADC rules are for identifying application messages associated with the IP-CAN session in which the address of the PCRF should be included. In this example, the ADC node identifies the SIP REGISTER message as an application message in which the address of the PCRF should be included, and therefore inserts the address of the PCRF into the SIP REGISTER message.

C3. The ADC node forwards the SIP REGISTER message towards the P-CSCF.

C4. The P-CSCF receives the SIP REGISTER message and obtains and stores the PCRF address for the AF session. The P-CSCF retains the stored PCRF until the user is deregistered from the IMS network.

C5. The P-CSCF then generates and sends an AAR message for a new AF session, which in this case may be a new Rx Diameter session, using the stored PCRF address in order to provide service information for the AF session to the PCRF. By using the stored PCRF address (obtained from the SIP REGISTER message received in step C4), the P-CSCF ensures that the AF session information is provided to the PCRF that is responsible for the associated IP-CAN session.

C6. The PCRF stores the service information and generates and sends an AAA message to the P-CSCF.

C7. The PCRF then proceeds to implement IP-CAN session modification in accordance with standard PCC procedures.

C8. For any subsequent attempt to initiate an IMS session, the UE generates and sends a SIP INVITE request towards the IMS.

C9. The P-CSCF receives the SIP INVITE message. The P-CSCF therefore generates and sends an AAR message using the stored PCRF address in order to provide further service information to the PCRF. By using the stored PCRF address (obtained from the SIP REGISTER message received in step C4), the P-CSCF ensures that the AF session information is provided to the PCRF that is responsible for the associated IP-CAN session.

C10. The PCRF stores the service information and generates and sends an AAA message to the P-CSCF.

C11. The PCRF then proceeds to implement IP-CAN session modification in accordance with standard PCC procedures.

The example described above in relation to FIG. 8 assumes that the AF (e.g. the P-CSCF) is stateful. As such, FIG. 8 illustrates the ADC node only inserting a PCRF address into the first/initial application message for the application (e.g. the SIP Register message) that traverses the ADC node. The AF (e.g. the P-CSCF) then obtains the PCRF address from the first application message it receives from the UE and stores this for use on each occasion that the AF provides service information to the PCRF. However, it is also possible that the AF is stateless, and therefore will not store the PCRF address provided in the first application. In this case, the ADC node will be provided/configured with an ADC rule that requires the PCRF address be inserted into all application messages received from the UE that are intended for the AF. The AF can then use the PCRF address received in each application message in order to provide service information to the PCRF, without having to store the PCRF address.

The examples described above in relation to FIGS. 7 and 8 are concerned with a UE having a single IP-CAN session. However, the methods described herein are equally applicable to circumstances in which a UE has multiple concurrent IP-CAN sessions wherein these IP-CAN sessions are managed by two or more different PCRFs. In such circumstances, each of the two or more PCRFs will receive requests relating to the establishment or modification of any IP-CAN session that is to be managed by that PCRF. Each PCRF can then determine one or more ADC rules for identifying application messages associated with the IP-CAN session in which the address of that PCRF should be included, and can provision these ADC rules to the appropriate ADC node. Consequently, any ADC nodes providing ADC functionality for any of the multiple concurrent IP-CAN sessions will ensure that the address of the PCRF that is handling that IP-CAN session is included in application messages sent to the AF, and the AF will use the received PCRF address when providing AF session information to the PCRF.

Figures 9, 10, 11:
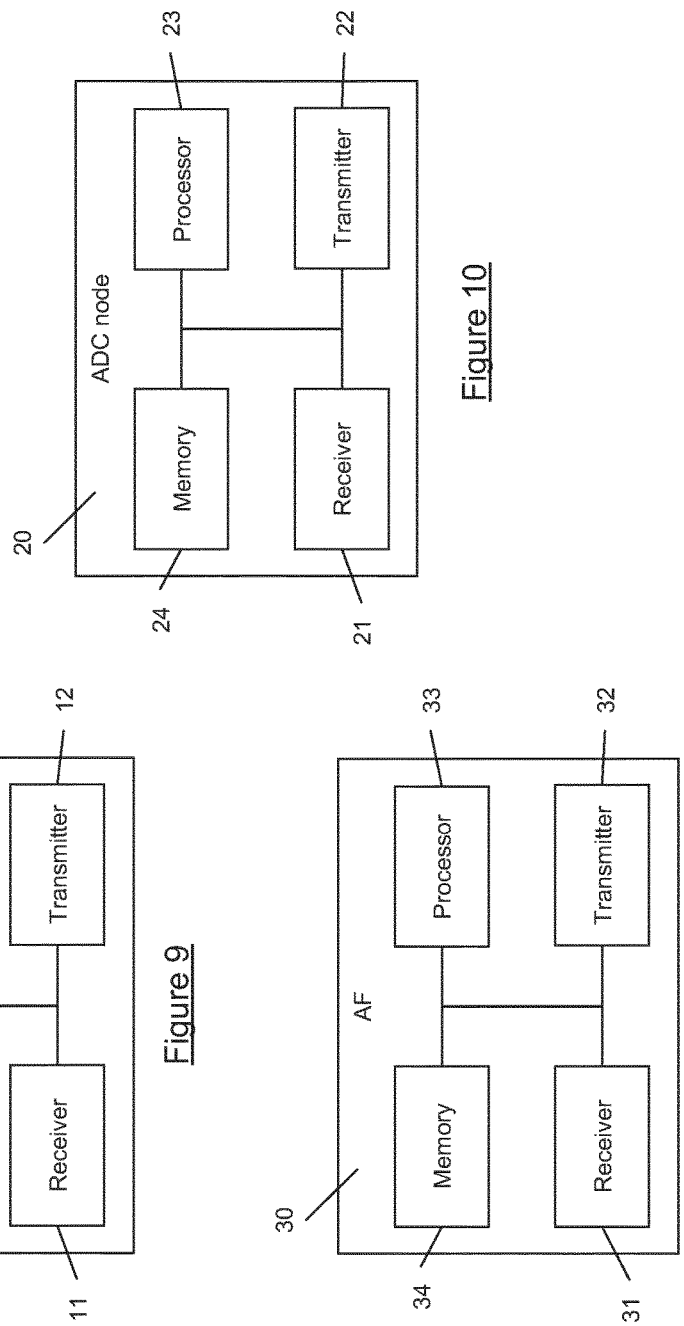
FIG. 9 illustrates schematically an embodiment of a PCRF configured to implement the methods described herein.
FIG. 10 illustrates schematically an embodiment of an ADC node configured to implement the methods described herein.
FIG. 11 illustrates schematically an embodiment of an AF 30 configured to implement the methods described herein.

FIG. 9 illustrates schematically an embodiment of a PCRF 10 configured to implement the methods described above. The PCRF 10 can be implemented as a combination of computer hardware and software and comprises a receiver 11, transmitter 12, a processor 13, and a memory 14. The memory 14 stores the various programs/executable files that are implemented by the processor 13, and also provides a storage unit for any required data. For example, the memory 13 can store user subscription information, PCC rules, ADC rules and any received service information. The programs/executable files stored in the memory 13, and implemented by the processor 14, include but are not limited to an ADC rule determination unit that is configured to determine ADC rules in accordance with the method described above.

FIG. 10 illustrates schematically an embodiment of an ADC node 20 configured to implement the methods described above. The ADC node 20 can be implemented as a combination of computer hardware and software and comprises a receiver 21, transmitter 22, a processor 23, and a memory 24. The memory 24 stores the various programs/executable files that are implemented by the processor 23, and also provides a storage unit for any required data. For example, the memory 23 can store ADC rules received from a PCRF and/or ADC rules configured at the ADC node. The programs/executable files stored in the memory 23, and implemented by the processor 24, include but are not limited to a Deep Packet Inspection unit, and an ADC rule implementation unit that is configured to implement/enforce ADC rules in accordance with the method described above.

FIG. 11 illustrates schematically an embodiment of an AF 30 configured to implement the methods described above. The AF 30 can be implemented as a combination of computer hardware and software and comprises a receiver 31, transmitter 32, a processor 33, and a memory 34. The memory 34 stores the various programs/executable files that are implemented by the processor 33, and also provides a storage unit for any required data. For example, the memory 33 can store a PCRF address received in any application messages. The programs/executable files stored in the memory 33, and implemented by the processor 34, include but are not limited to an PCRF addressing unit configured to use a PCRF address received in any application messages when providing service information to a PCRF for an AF session in accordance with the method described above.

The methods and apparatus described above provide that all AF sessions for an IP-CAN session reach the same PCRF when more than one PCRF is deployed in an operator network, without the need for specific configuration in the network to ensure that the same PCRF is always found. In doing so, these methods and apparatus also allow for the re-use of an IP address in VPN scenarios or multi-tenancy networks without the risk that this will prevent selection of the appropriate PCRF. Furthermore, these methods and apparatus do not require network operators to deploy DRAs, reducing the signalling required to resolve a PCRF address, and thereby reducing operating and capital expenditures for network operators.

Although the invention has been described in terms of preferred embodiments as set forth above, it should be understood that these embodiments are illustrative only.

Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, in the illustrated example signalling flow diagrams described above, only those messages and headers that are of particular relevance are shown. Those skilled in the art will be aware those messages and headers that have not been included in this illustration. In addition, in the above described embodiments, the PCRF determines the ADC rules and provisions these ADC rules to the ADC node at IP-CAN session establishment. However, the PCRF could also be configured to determine the ADC rules and provisions these ADC rules to the ADC node at any other point, as required by the network operator's policies. Furthermore, whilst the above described embodiments are concerned with an IMS application in which SIP is used as the application layer protocol, the methods and apparatus described above are equally application to other types of applications that make use of other application layer protocols.

The invention claimed is:

1. A method of ensuring that all Application Function, AF, sessions for an IP Connectivity Access Network, IP-CAN, session reach the same Policy and Charging Rules Function, PCRF, when more than one PCRF is deployed in an operator network, the method comprising, at a Policy and Charging Rules Function, PCRF:
   upon receipt of a request relating to the establishment or modification of the IP-CAN session, determining an Application Detection and Control, ADC, rule for identifying application messages associated with the IP-CAN session in which an identifier of the PCRF must be included in order to identify to the AF that the PCRF is handling the IP-CAN session; and
   notifying a node that implements application detection and control of the ADC rule for identifying the application messages in which the identifier of the PCRF must be included in order to identify to the AF that the PCRF is handling the IP-CAN session.

2. The method as claimed in claim 1, wherein the step of notifying a node that implements application detection and control of the ADC rule comprises any one of:
   installing the ADC rule at the node that implements application detection and control; and
   activating the ADC rule at the node that implements application detection and control.

3. The method as claimed in claim 1, wherein the node that implements application detection and control is any one of:
   a Policy and Charging Enforcement Function, PCEF, enhanced with ADC; and
   a Traffic Detection Function, TDF.

4. The method as claimed in claim 1, wherein the ADC rule includes the identifier of the PCRF that must be included in an application message identified by the ADC rule.

5. A method of ensuring that all Application Function, AF, sessions for an IP Connectivity Access Network, IP-CAN, session reach the same Policy and Charging Rules Function, PCRF, when more than one PCRF is deployed in an operator network, the method comprising, at a node that implements application detection and control:
   receiving, from a PCRF, notification of an Application Detection and Control, ADC, rule that is to be applied for the IP-CAN session, wherein the ADC rule identifies application messages associated with the IP-CAN session in which an identifier of the PCRF must be included in order to identify to the AF that the PCRF is handling the IP-CAN session; and
   using the ADC rule to identify an application message associated with the IP-CAN, inserting the identifier of the PCRF into the identified application message, and forwarding the identified application message to the AF.

6. The method as claimed in claim 5, wherein the step of receiving, from a PCRF, notification of an ADC rule comprises any one of:
   receiving the ADC rule from the PCRF for installation at the node; and
   receiving from the PCRF an instruction to activate the ADC rule, wherein the ADC rule is configured at the node.

7. The method as claimed in claim 5, wherein the node that implements application detection and control is any one of:
   a Policy and Charging Enforcement Function, PCEF, enhanced with ADC; and
   a Traffic Detection Function, TDF.

8. The method as claimed in claim 5, wherein the ADC rule includes the identifier of the PCRF that must be included in an application message identified by the ADC rule.

9. The method as claimed in claim 5, wherein the ADC rule identifies a Session Initiation Protocol, SIP, message.

10. The method as claimed in claim 9, wherein the method comprises:
    using the ADC rule to identify a SIP message associated with the IP-CAN, inserting the identifier of the PCRF into the SIP message, and forwarding the SIP message to a Proxy Call Session Control Function, P-CSCF.

11. An apparatus configured to operate as a Policy and Charging Rules Function, PCRF, the apparatus comprising:
    a receiver configured to receive a request relating to establishment or modification of an IP-CAN session;
    a processor configured to determine an Application Detection and Control, ADC, rule for identifying application messages associated with the IP-CAN session in which an identifier of the PCRF must be included in order to identify to the AF that the PCRF is handling the IP-CAN session; and
    a transmitter configured to notify a node that implements application detection and control of the ADC rule for identifying the application messages in which the identifier of the PCRF must be included in order to identify to the AF that the PCRF is handling the IP-CAN session.

12. The apparatus as claimed in claim 11, wherein the apparatus is configured to notify a node that implements application detection and control of the ADC rule by implementing any one of:
    installation of the ADC rule at the node that implements application detection and control; and
    activation of the ADC rule at the node that implements application detection and control, wherein the ADC rule is configured at the node.

13. The apparatus as claimed in claim 11, wherein the transmitter is configured to notify any one of:
    a Policy and Charging Enforcement Function, PCEF, enhanced with ADC; and
    a Traffic Detection Function, TDF.

14. An apparatus configured to operate as a node that implements application detection and control, the apparatus comprising:
    a receiver configured to receive, from a Policy and Charging Rules Function, PCRF, notification of an Application Detection and Control, ADC, rule that is to be applied for an IP-CAN session, wherein the ADC rule identifies an application message associated with the IP-CAN session in which an identifier of the PCRF must be included in order to identify to the AF that the PCRF is handling the IP-CAN session;
    a processor configured to use the ADC rule to identify an application message associated with the IP-CAN session, and to insert the identifier of the PCRF into the identified application message; and
    a transmitter configured to forward the identified application message to an Application Function, AF.

15. The apparatus as claimed in claim 14, wherein the processor is configured to obtain the identifier of the PCRF from the ADC rule.

16. The apparatus as claimed in claim 14, wherein the apparatus is configured to operate as any one of:
    a Policy and Charging Enforcement Function, PCEF, enhanced with ADC; and
    a Traffic Detection Function, TDF.

17. The apparatus as claimed in claim 14, wherein the transmitter is configured to forward the application message to a Proxy Call Session Control Function, P-CSCF, of an IP Multimedia Subsystem.

18. The apparatus as claimed in claim 17, wherein the receiver is configured to receive a Session Initiation Protocol, SIP, message from a User Equipment, UE, for which the IP-CAN session has been established, the processor is configured to insert the identifier of the PCRF into a header of the SIP message, and the transmitter is configured to forward the SIP message to the P-CSCF.

* * * * *